Dec. 2, 1958     A. SZEGVARI     2,862,845
MAGNETIZABLE BANDS
Filed Oct. 25, 1954

INVENTOR.
ANDREW SZEGVARI
BY
AGENT

United States Patent Office 2,862,845
Patented Dec. 2, 1958

2,862,845

MAGNETIZABLE BANDS

Andrew Szegvari, Akron, Ohio, assignor to Clevite Corporation, Cleveland, Ohio, a corporation of Ohio Application October 25, 1954, Serial No. 464,485

5 Claims. (Cl. 154—53.6)

This invention relates broadly to a process of producing magnetizable bands and the article of manufacture produced thereby.

The invention more specifically relates to the production of laminated magnetizable bands wherein a relatively thin layer of magnetizable elastomer is bonded to a non-magnetizable backing.

A magnetizable band is useful as a signal storage medium for calculators, computers, memory devices, telephone answering devices and the like. For such uses it is advantageous to have a band having a maximum surface area with considerable width to accommodate a plurality of recorded tracks and of a relatively large diameter such that a maximum amount of information may be recorded on each track.

The magnetizable bands used heretofore have been produced by molding and curing an elastomer dispersion of magnetic iron oxide in a cavity mold. The molded bands are limited in surface area due to inherent difficulties of molding bands of large diameters and widths in a cavity mold. Further the molded bands are required to be made relatively thick, on the order of from about 1/16 to 1/8 of an inch or more.

The flow and distribution of the elastomer dispersion within the mold cavity become an important factor in the thickness of the molded bands. The wider the band to be produced the thicker it must be to assure proper flow and distribution. Further, since the loading of the elastomer with magnetic iron oxide reduces the resiliency and flexibility of the elastomer, a relatively thick band is required to retain sufficient compliance to insure intimate contact with the magnetic head.

The present invention overcomes these and other disadvantages as set forth in the following specification, appended claims and attached drawings. This invention makes possible the production of novel laminated magnetizable elastomer endless splice-free bands of any practicable width and diameter containing a minimum amount of magnetic iron oxide loaded elastomer and of minimum over-all thickness. The invention is further applicable to the production of laminated magnetizable sheets, discs or strips depending on the form used.

Briefly the present invention involves providing a first elastomer bath having dispersed therein finely divided magnetic oxide and a second elastomer bath, dipping a form into said first elastomer bath to deposit thereon a magnetizable elastomer layer and dipping into said second elastomer bath to build up a substantially non-magnetic backing.

Figure 1:
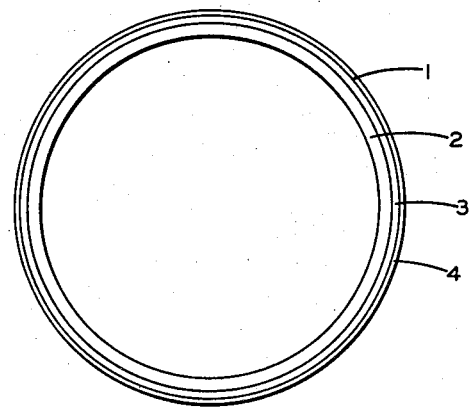
Fig. 1 shows a cylindrical form in section carrying a cured laminated magnetizable band of the invention.

An important object of this invention is the production of a thin laminated magnetizable elastomer article having a large surface area to accommodate a plurality of recording tracks each of considerable length.

A further important object of this invention is the production of a thin laminated magnetizable elastomer article having the magnetic iron oxide concentrated only in a surface lamination.

A further important object of this invention is the production of a thin laminated magnetizable elastomer article having low background noise characteristics.

A further important object of this invention is the production of a thin laminated magnetizable elastomer article displaying uniform frequency response.

A further object of this invention is the production of a laminated magnetizable elastomer article having a uniform frequency response, characterized by low background noise and high compliance.

A further object of the invention is to provide a thin magnetizable elastomer layer bonded to a relatively thicker non-magnetizable elastomer layer.

In the formation of the laminated magnetic band of the invention different materials are used, one for the magnetic layer and one for the so-called backing layer. The magnetic layer is formed from a cement which is essentially lyophilic having dispersed therein a specially prepared finely divided magnetic oxide referred to in more detail later in the disclosure.

"Cement" is used herein to refer to a high-molecular-weight synthetic elastomer solvated in a volatile solvent which substantially entirely dissolves the elastomer. The elastomer may be "neoprene," a trade name for chloroprene rubbers, "Hycar," a trade name for butadiene-acrylonitrile polymers, "G. R. S.," a trade name for Government Rubber Styrene, comprising styrene butadiene, "Hypalon," a trade name for chloro-sulphonated polyethylene polymers, mixtures thereof, etc. While natural rubber may be used it has a tendency to shelf age and deteriorate more rapidly than synthetic elastomers. The solvent will depend upon the elastomer and may, for example, be methyl alcohol, ethyl alcohol, butyl alcohol or other low boiling alcohol; methyl acetate, amyl acetate, ethyl butyrate or other ester; methyl-ethyl ketone or other ketone; a low boiling coal tar or petroleum fraction, etc. By low boiling I mean a solvent which evaporates sufficiently rapidly under commercial conditions of production to permit cements made therefrom to be used in large scale dipping operations, with subsequent rapid evaporation of the solvent therefrom.

Dispersion of the magnetic oxide in the cement may be accomplished in a ball mill or the like or preferably a device such as described in my patent application Serial No. 163,837, filed May 24, 1950, now issued as Patent No. 2,764,359.

The cements being lyophilic are usually high in viscosity even in low concentrations and therefore only thin films can be dipped in one step. However, the cements lend themselves well to a high degree of loading with magnetic oxide and a high degree of microscopic homogeneity is obtainable if the fundamental matrix is entirely solvated. Furthermore, the matrix in the solvated condition acts as a protective colloid in the distribution of the oxide, which is particularly valuable in the distribution of magnetic oxides which are normally difficult to disperse. Further the cements are valuable in that they form a thin magnetizable layer since it is advantageous to have a relatively thin magnetic layer having a microscopically homogeneous dispersion of magnetic oxide therein.

The backing layer is formed from a latex-type liquid which is essentially suspensoid. Suspensoid systems can be obtained with very high concentrations of the film forming component, much higher than are obtainable with the lyophilics, and methods have been developed by which deposits of considerable thickness can be formed by a single dipping operation much thicker than can be obtained by a single dipping in a lyophilic. The so-called coagulant process is most widely used for that purpose. Because of the rapidity with which thick deposits can be obtained, for economic reasons the suspensoid system is generally preferred to build up the relatively thick backing layer. Thus since it is difficult or impossible to incorporate many finely divided materials, particularly magnetic oxides, in suspensoids, the lyophilics are preferred for supporting the magnetic oxide. The suspended particles of the film-forming component of a suspensoid have a diameter (or other through measurement) of $\frac{1}{10}$ to 1 micron, and usually even larger, which is so large as to prohibit obtaining microscopic homogeneity, and grinding causes coagulation. Likewise, it is impossible to incorporate in most suspensoids magnetic oxides since they usually have a positive electric charge or a great tendency for kinetic instability, regardless of the degree of homogeneity required. Such materials cause flocculation in suspensoids making them difficult to use in industrial processing.

The process lends itself well to the production of magnetizable elastomer bands since the band may be formed with a first thin layer dipped from such a lyophilic system having dispersed therein a high concentration of a magnetic oxide which first layer displays the quality of microscopic homogeneity essential for high quality magnetic recording and which further may be covered and rapidly built up to a desired thickness by subsequent dipping in an inexpensive non-magnetic suspensoid to provide a backing layer. This backing layer provides support and resiliency to the thin highly loaded magnetic oxide layer.

The following preferred procedure utilizes both systems and gives a product in which the latex deposit is firmly adhered to a deposit of magnetic oxide loaded solvated elastomer. The form is first dipped in a magnetic oxide loaded material solvated in a solvent. The deposit is evaporated to dryness. The dry film is heated above 120° F. and preferably 150° F. or thereabouts, and in this warm condition dipped into a suspensoid. This film is semi-dried and then dipped into a coagulant, of which there are many such as acetic or hydrochloric acid in water, calcium nitrate in water, calcium chloride in a mixture of alcohol and acetone, ammonium borate plus boric acid in water. It is then dipped in the same or different suspensoid. Several dips in the same or different suspensoid may be used with intervening dips in coagulant to build up the desired thickness. The article is then dried and if it is curable, it is then cured.

Referring to Figure 1 there is illustrated a cured laminated band 1 on the cylindrical form 2 with the magnetizable lyophilic cement-type layer 3 adjacent the polished surface of the form and a non-magnetizable latex-type layer 4 bonded thereto. The elastomer of layer 3 may be the same as layer 4, or different, and except for the magnetic oxide they may be compounded the same so that they vulcanize simultaneously, or they may be compounded differently.

Figure 2:
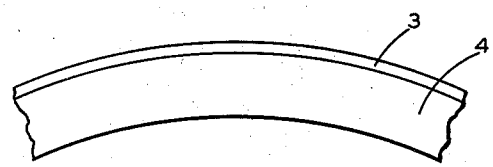
Fig. 2 is an enlarged section of a portion of a laminated magnetizable band of the invention.

Figure 2 illustrates an enlarged section of the band of Figure 1 showing the relative thickness of the magnetic and non-magnetic layers.

Figure 3:
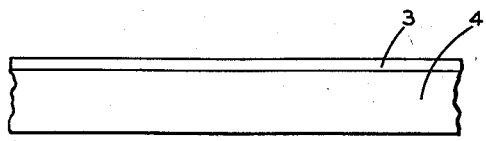
Fig. 3 is an enlarged section of a portion of a laminated magnetizable sheet of the invention.

Figure 3 illustrates an enlarged section of laminated magnetizable material deposited on a flat form to produce a sheet.

The invention is further illustrated by the following example:

*Example magnetic band*

In making a magnetic band or belt which will have a property of being magnetized and retaining a record of such magnetization built into one surface, one surface of such band is pigmented with a magnetizable material such as a specially prepared finely divided magnetic iron oxide, etc. such as is described in my copending United States application Serial No. 449,383, filed August 12, 1954, now issued as Patent No. 2,719,009. The band may be turned inside out so that either the inner or outer surface is pigmented.

A highly polished cylinder, made of a material such as aluminum and the like, is dipped into a suspension of 25 parts micronized mica suspended in 100 parts alcohol having been freshly stirred. After evaporating the solvent the form is dipped in a cement of the following composition:

| | Parts by weight |
|---|---|
| Neoprene GN | 100 |
| Magnesium oxide | 4 |
| Zinc oxide | 5 |
| Magnetic iron oxide specially processed | 100 |
| Paraffin wax | 3 |

The foregoing composition is processed to a 20% concentration in toluene and strained. This requires five hours in the apparatus of the type described in my foregoing application, or much longer in a ball mill.

The form is dipped in the cement, removed, the solvent evaporated until semi-dried, dipped again and the solvent evaporated completely. The form may be inverted on alternate dippings to assure an even coating of cement. Thereafter the form is heated up to 150° F. and dipped into the following latex compound:

| | Parts by weight |
|---|---|
| Neoprene latex [1] | 100 |
| Zinc oxide | 5 |
| Silica (finely divided) | 10 |
| Clay (finely ground) | 5 |
| Medium particle size Furnace Black | 10 |
| Neozone D | 2 |

[1] 100 parts (dry weight) is used.

"Neozone D" is a trade name for phenyl beta naphthylamine. After dipping into this compound the form is removed, semi-dried and dipped into a coagulant containing 80 parts of methyl alcohol, 20 parts of ethyl alcohol, 5 parts acetone and 20 parts of calcium nitrate. On removal from this coagulant, the solvent is evaporated by air drying for 40 seconds and the form is again dipped in the latex for 2½ minutes. It is then dipped again in the coagulant, and is finished by dipping again for 2 minutes in the latex. It is dried at 135° F. and cured at 325° F. for 25 minutes and removed from the form.

In some applications the following latex-type compound may be substituted for the above:

| | Parts by weight |
|---|---|
| Neoprene [1] | 100 |
| Zinc oxide | 5 |
| Specially processed magnetic oxide | 50 |
| Neozone D | 2 |

[1] 100 parts (dry weight) is used.

"Neozone D" is a trade name for phenyl beta naphthylamine. This substitution produces a band having reduced magnetizable properties in the backing layer.

In other applications it may be desirable to omit the backing layer and build up the band with a plurality of magnetizable cement layers.

Instead of dipping in the cement or latex, the whole or only limited areas may be sprayed with like results.

By using a flat form a magnetizable sheet may be produced.

The size of the bands that can be produced by the process of the invention are limited only by the form size and the size of the latex bath container. Further the magnetizable layer can be made very thin, on the order of 0.005 of an inch or less. The over-all thickness of the band will then depend upon the amount of elastomer added to the backing layer. A suitable thickness for the backing in one application is about .025 inch.

Several advantages accrue from the use of a thin magnetizable layer of which the following are a few:

First, a thin layer is more easily erased since the high frequency erase current does not have to penetrate deeply. Where a thick magnetizable layer is used some frequencies, particularly low frequencies of longer wave lengths, penetrate deeply into the magnetizable material and on erasure are not completely neutralized. Repeated use of the band by recording and erasing leaves a random magnetization, by these low frequency components, deep within the band. This random magnetization shows up as background noise of increasing magnitude with use.

Bands having a thin magnetizable layer are more completely neutralized on erasure which substantially eliminates background noise of low frequency origin.

Secondly; a band having a thin magnetizable layer displays a more uniform frequency response than a band having a thick magnetizable layer. With the thick layer the higher frequencies are at a disadvantage since they cannot utilize the full thickness of the layer as can the low frequencies; therefore, the low frequency components are recorded at a higher level than the high frequencies which on playback appear attenuated. With a thin magnetizable layer the high and low frequency components are recorded at approximately the same level and on playback gives a more uniform frequency response.

Thirdly; imperfections within the magnetizable layer such as agglomerations of oxide particles and bubbles are more pronounced in the thick layers of the molded bands than in thin layers and have the greatest effect on the low frequency components which contribute to a higher background noise level in molded bands.

Fourthly; thin bands of the invention are more compliant than thick bands providing more intimate contact with a magnetic head and conforms more closely to the contour of the supporting drum in use, as a recording medium, resulting in a high degree of concentricity therewith.

And fifth; the bands of the invention do not require the costly dies needed to produce bands of the molded variety and being thinner require less raw material to achieve a better result.

There are no apparent limitations on the width and diameter of bands producible by the process of the invention in contrast to the prior art.

While there have been described here what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A laminated magnetizable article comprising a first layer of magnetizable rubber having good wearing properties when moved in contact with a magnetic transducer head and a second layer of non-magnetizable rubber bonded to said first layer.

2. A laminated magnetizable article as set forth in claim 1, further characterized by said first layer being thin compared to said second layer.

3. A laminated magnetizable article as set forth in claim 2, further characterized by said second layer having better elastic properties than said first layer.

4. A laminated magnetizable article as set forth in claim 3, further characterized by iron oxide powder only in said first layer.

5. A laminated magnetizable article comprising a first relatively thin layer of chloro-sulphonated polyethylene polymers having magnetizable particles distributed througout its volume and having good wearing properties when moved relative to and against a magnetic transducer head, and a second relatively thick layer of chloroprene rubber having better elastic properties than said first layer bonded to said first layer, the exposed surface of said first layer forming a smooth, wear resistant surface for contacting a transducer head and the better elastic properties of said second layer causing said laminated article to establish good transducing contact with a magnetic transducer head.

References Cited in the file of this patent

UNITED STATES PATENTS

| | | |
|---|---|---|
| 2,123,180 | Corbin et al. | July 12, 1938 |
| 2,464,060 | Rowe et al. | Mar. 8, 1949 |
| 2,465,282 | Schmidt et al. | Mar. 22, 1949 |
| 2,633,431 | De Sylva | Mar. 31, 1953 |
| 2,734,033 | Menard | Feb. 7, 1956 |

FOREIGN PATENTS

| | | |
|---|---|---|
| 153,598 | Australia | Oct. 13, 1953 |
| 340,705 | Great Britain | Jan. 8, 1931 |